Oct. 14, 1924.
H. D. JAMES
1,511,341
CONTROL SYSTEM
Filed April 18, 1919
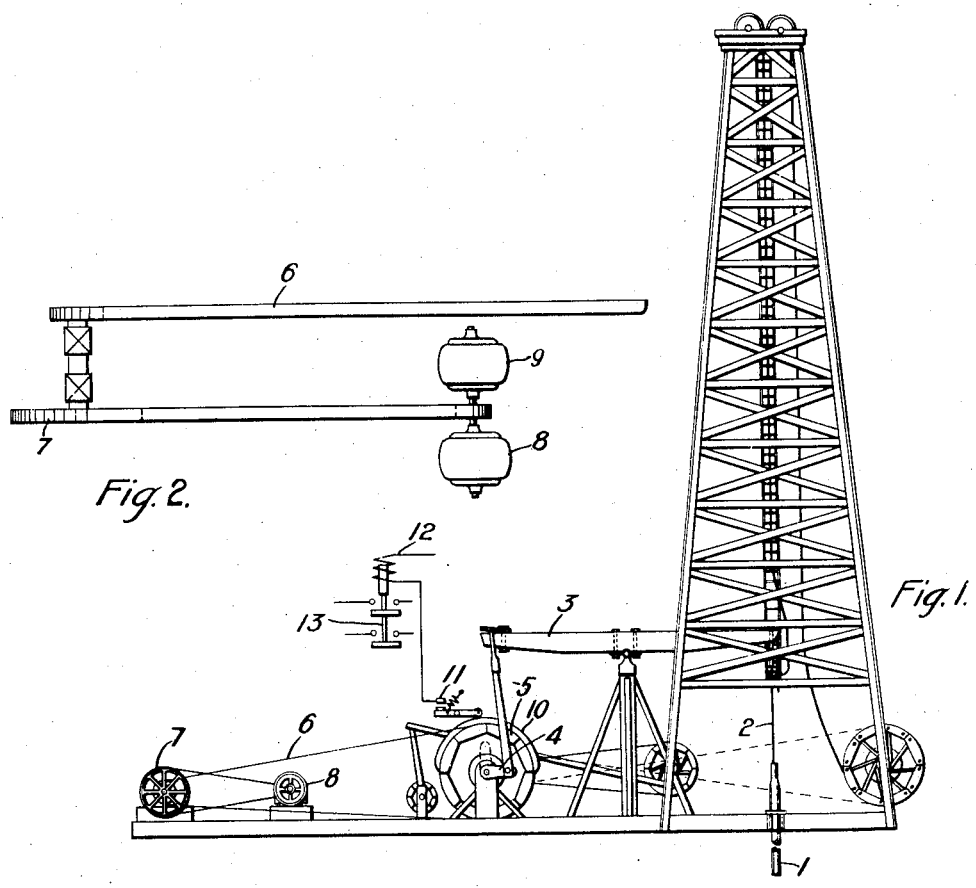
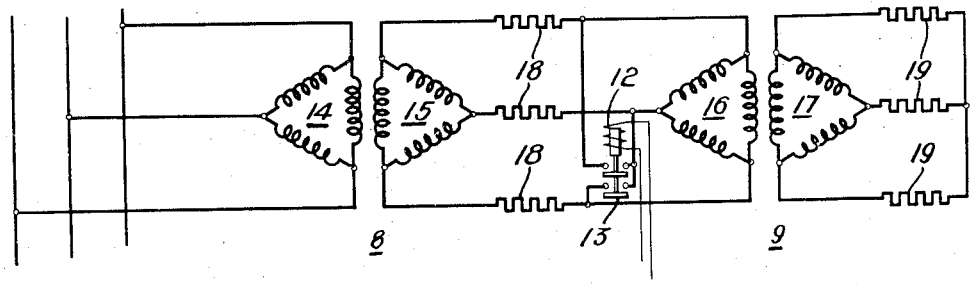
WITNESSES:
H. T. Shelhamer
David Rines
Fig. 3.   INVENTOR
Henry D. James
BY
Wesley G. Carr
ATTORNEY Patented Oct. 14, 1924.

1,511,341

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed April 18, 1919. Serial No. 290,967.

*To all whom it may concern:*

Be it known that I, HENRY D. JAMES, a citizen of the United States, and a resident of Edgewood Park, in the county of Allegheny and State of Pennsylvania, have invented a new and useful Improvement in Control Systems, of which the following is a specification.

My invention relates to motor-control systems and particularly to systems for controlling drilling-tool motors.

The operations of drilling and pumping oil wells are so dissimilar as to require the employment of motors of different power and characteristics. In drilling, the object is to strike as hard a blow as possible with the falling drilling tool. In order that the inertia of the electric motor may not retard the falling of the tool, the motor should be accelerated during the falling operation. During the raising of the tool, on the other hand, the motor speed should be slower and the torque greater. In view of the peculiar requirements of drilling-tool motors, therefore, separate equipments have been employed for pumping and for drilling, the drilling equipment being moved from place to place and the pumping equipment being permanently installed, following the drilling operation.

The object of my invention is to provide a motor-control system whereby the same motors which are employed for pumping may be employed also for drilling.

According to my invention, two standard motors, either of which may later be employed for pumping purposes and both of which may later be employed for more heavy work, such as is occasionally found desirable in connection with oil wells, are connected in cascade during drilling. The motors are thus operated at slow speed during such time as the drilling tool is being lifted. Upon the tool reaching its maximum height, a master switch is operated to short-circuit the cascade-connected motor, leaving the other motor alone in control of the tool, which motor will accordingly operate at increased speed during the falling operation. Upon the tool reaching its lower limit of travel, the motors will again become connected in cascade so as to yield a strong pulling effect at slow speed.

My invention will be described in connection with the accompanying drawings in which Figure 1 is a side elevational view of a drilling equipment. Fig. 2 is an enlarged plan view of a detail, and Fig. 3 is a diagrammatic view of motor circuits arranged according to my invention.

The drilling tool 1 is connected, by a cable 2, to a walking beam 3, which is operated through a crank 4 that is rotatable with a wheel 5 which is connected, by a belt 6, to a countershaft apparatus 7 that is operable by a pair of motors 8 and 9. The motors 8 and 9 are, for convenience, shown as mounted upon the same shaft, though this constructional form is by no means essential to my invention. The wheel 5 is provided with a cam 10 upon substantially one-half of its periphery, which cam is adapted to operate a switch 11 for closing the circuit of an actuating coil 12 of a switch 13. The cam 10 is designed to effect the opening of the switch 11 when the crank 4 is in its uppermost position, corresponding to the lowermost position of the drilling tool 1, and to effect the closing of the switch 11 when in its lowermost position, corresponding to the uppermost position of the drilling tool 1.

The motor 8 is provided with a primary winding 14 and a secondary winding 15, and the motor 9 with a primary winding 16 and a secondary winding 17. Resistors 18 are connected in circuit with the secondary winding 15, and resistors 19 in circuit with the secondary winding 17. The primary winding 16 of the motor 9 is connected in circuit with the secondary winding 15 of the motor 8 but is adapted to be short-circuited by the switch 13 during such time as the drilling tool 1 is being lifted.

The motors 8 and 9 operate the crank 4, through the above-described connections, to effect the operation of the walking beam 3, which, in turn, effects the lifting and the lowering of the drilling tool 1 through the cable 2, which is secured to the walking beam 3. When the crank 4 occupies the dotted-line position of Fig. 1, the drilling tool 1 has reached its lowermost position, in which it should strike with a maximum force. At this moment, the switch 11 will be opened by the cam 10 to effect the de-energization of the coil 12 and the consequent opening of the switch 13. The motors 8 and 9 will thereupon become connected in cascade so as to operate at slow speed. The drilling tool 1 will thereby be lifted, following its rebound, at the desired slow speed, the cascade connected motors, at that time, exerting their maximum torque. The speed and the torque may be controlled by the resistors 18 and 19. Upon the crank 14 reaching its lowermost position, 180° away from that indicated in dotted lines, the drilling tool 1 will have reached its uppermost position and the switch 11 will become released from engagement with the cam 10 to permit its being reclosed, as by means of a spring. The switch 13 will thereupon become closed to effect the short-circuiting of the primary winding 16 of the motor 9. The motor 8 will then alone be connected to the source of energy so that it will operate at maximum speed, thereby effecting the operation of the crank 4 at increased speed so as to prevent the drilling tool 1 being held back by the inertia of the moving parts. The speed of the motor 8 may be controlled by the resistor 18.

Following the drilling operation, the motors 8 and 9 may be employed singly for pumping purposes or in parallel for more heavy work.

Modifications will occur to those skilled in the art and are intended to be covered by the appended claims.

I claim as my invention:

1. The combination with a tool and a pair of motors for operating the same, each having a primary winding and a secondary winding, of means for connecting the primary winding of one of said motors in circuit with the secondary winding of the other of said motors when said tool occupies a predetermined position, and means for short-circuiting said primary winding when said tool occupies a second predetermined position.

2. The combination with a drilling tool, a wheel for operating the same, and a pair of induction motors for rotating said wheel, each of said motors having a primary winding and a secondary winding, of means for connecting the primary winding of one of said motors in circuit with the secondary winding of the other of said motors when said tool is being lifted, a switch for short-circuiting said primary winding, and a cam carried by said wheel for operating said switch upon said tool reaching the end of its upward movement.

3. In an oil-well drilling system, the combination with a drilling tool and electric driving means therefor, of means for automatically accelerating the driving means when the tool begins to drop.

4. In an oil-well drilling system, the combination with a drilling tool and electric driving means therefor, of means for automatically accelerating the driving means when the tool begins to drop and for slowing down the driving means when the tool starts to rise.

5. In a control system, the combination with a plurality of induction motors connected in cascade relation and adapted to drive a common load, of means for automatically short-circuiting the secondary of the first of the cascaded motors for a certain operating period.

6. In a control system, the combination with a plurality of induction motors connected in cascade relation and adapted to drive a common load, of means for periodically short-circuiting the secondary of the first of the cascaded motors.

7. In a control system, the combination with a plurality of motors adapted to drive a common load, of means for automatically changing and restoring certain operating characteristics of a portion of said motors for predetermined relative periods.

8. In a control system, the combination with a plurality of motors adapted to drive a common load, of means for automatically changing and restoring the speed-torque characteristics of a portion of said motors for predetermined relative periods.

9. In a control system, the combination with a plurality of motors adapted to drive a common load, of means for automatically changing and restoring the speed-torque characteristics of a portion of said motors for periods respectively corresponding to substantially equal movements of the load.

10. In an oil-well drilling system, the combination with a drilling tool and electric driving means therefor, of means for automatically accelerating said driving means during the down stroke of the tool and slowing down said driving means during the up stroke of the tool.

11. In a control system, the combination with a plurality of induction motors connected in cascade relation and adapted to drive a common load, of means for automatically increasing and decreasing the excitation of the motors for predetermined relative operating periods.

12. In a control system, the combination with a plurality of induction motors connected in cascade relation and adapted to drive a common load, of means for automatically increasing and decreasing the excitation of the motors for periods respectively corresponding to substantially equal movements of the load.

13. In an oil-well drilling system, the combination with a drilling tool and driving means therefor comprising a plurality of induction motors connected in cascade relation, of means for automatically increasing and decreasing the excitation of the motors during the up stroke and the down stroke of the drilling tool, respectively.

14. The combination with a drilling tool, a wheel for operating said tool, and driving means therefor comprising a plurality of induction motors connected in cascade relation, of means for rendering one of said motors operative or inoperative, and cam means carried by said wheel for governing said means.

15. The combination with a drilling tool, a wheel for operating said tool, and driving means therefor comprising a plurality of induction motors connected in cascade relation, of switching means for short-circuiting one of said motors or removing the short-circuit therefrom, and cam means actuated by said wheel for governing said means to apply said short-circuit during the down stroke of the tool and remove the short-circuit during the up stroke of the tool.

16. The combination with a drilling tool, and driving means therefor comprising a pair of induction motors connected in cascade relation, of switching means responsive to the position of said tool for short-circuiting the second motor in the cascade train.

In testimony whereof, I have hereunto subscribed my name this 31st day of March, 1919.

HENRY D. JAMES.